(12) United States Patent
Hsueh et al.

(10) Patent No.: US 8,769,691 B1
(45) Date of Patent: Jul. 1, 2014

(54) NETWORK TRAFFIC REDUCTION

(75) Inventors: Gary Hsueh, New Taipei (TW); Jeff Kuo, Taipei (TW); Sam Chang, New Taipei (TW); Shako Ho, Keelung (TW); Norman Wang, New Taipei (TW)

(73) Assignee: Trend Micro, Inc., Tokyo (JP)

( * ) Notice: Subject to any disclaimer, the term of this patent is extended or adjusted under 35 U.S.C. 154(b) by 186 days.

(21) Appl. No.: 13/027,178

(22) Filed: Feb. 14, 2011

(51) Int. Cl.
*G06F 7/04* (2006.01)
*G08B 23/00* (2006.01)

(52) U.S. Cl.
USPC ................................ 726/24; 726/23; 713/380

(58) Field of Classification Search
USPC ........................ 726/22–24; 713/188
See application file for complete search history.

(56) References Cited

U.S. PATENT DOCUMENTS

| | | | |
|---|---|---|---|
| 6,353,847 B1 * | 3/2002 | Maruyama et al. ........... | 718/105 |
| 6,574,669 B1 * | 6/2003 | Weaver ......................... | 709/239 |
| 2002/0175998 A1 * | 11/2002 | Hoang .......................... | 348/148 |
| 2004/0032826 A1 * | 2/2004 | Sridhar ......................... | 370/222 |
| 2007/0022129 A1 * | 1/2007 | Bahar et al. ................... | 707/100 |
| 2007/0240219 A1 * | 10/2007 | Tuvell et al. .................... | 726/24 |
| 2008/0134337 A1 * | 6/2008 | Crescenzo et al. .............. | 726/24 |
| 2008/0301769 A1 * | 12/2008 | Parkinson ........................ | 726/2 |
| 2009/0100459 A1 * | 4/2009 | Riedl et al. ...................... | 725/35 |
| 2011/0270987 A1 * | 11/2011 | Schlansker et al. ........... | 709/226 |

\* cited by examiner

*Primary Examiner* — Douglas W Owens
*Assistant Examiner* — Monica C King
(74) *Attorney, Agent, or Firm* — Beyer Law Group LLP

(57) ABSTRACT

A server access log includes data records each describing a previous query regarding a suspect computer file of a client computer. Each record includes the CRC code for the suspect computer file, the result of the malware analysis performed on the backend server and other attributes and values. The log is analyzed to retrieve relevant attributes and values from each record. Key attributes and values are generated such as region and continuous query. All CRC codes are grouped according to attribute values. Each group is analyzed to determine the network traffic associated with downloading the entire group to all user computers and the network traffic associated with not downloading the group but responding to future malware queries regarding CRC codes in the group. CRC codes are removed from each group if necessary. CRC code-result pairs for each group are downloaded to all user computers as a pre-fetch cache.

24 Claims, 10 Drawing Sheets

File Reputation Service

| Attribute | Value | |
|---|---|---|
| IP Address | 213.186.98.255 | 304 |
| LogTime | [27/Mar/2010:20:33:25 +000] | 308 |
| DestServer | icrc-origin.trendmicro.com.akadns.net | 312 |
| BFVer | BF=1017201300 | 316 |
| CRCType  320 | LCRC=AB795571F586FB4A15AFCE3C92EA64B8 | |
| StatusCode | 200 | 324 |
| Size | 221 | 328 |
| Product | OSCE;10.0;1736 | 332 |
| ServerGUID | 172e727b-2be7-4d80-8cb8-4982190e45d7 | 336 |
| ClientGUID | e448afc8-31a4-4c5b-bd54-34e4973e2fe9 | 340 |
| Result | Malicious | 342 |

Access Log Attributes

FIG. 4

| Attribute | Value | Explanation |
|---|---|---|
| ContinuousQuery 354 | Count Number | An attribute to identify the client who sends same CRC query within the next second. |
| Region  358 | Country | Convert from IP key to region in country. |
| UpToDatePattern 362 | Yes/No | Determine if the new query client has BFVer that is not within the last 24 hours period. |
| CRCSummaryCount 366 | Client individual count | How many CRC queries has this client sent? |

Defined Attributes

FIG. 5

NETWORK TRAFFIC REDUCTION

FIELD OF THE INVENTION

The present invention relates generally to malware detection. More specifically, the present invention relates to reducing network traffic associated with detection of malware.

BACKGROUND OF THE INVENTION

In the field of antivirus protection for computers and enterprise networks, a file reputation service may be employed to check the legitimacy of certain files on user computers. Current file reputation services (or, file reputation technology) often use a cache mechanism to speed up response times. A file reputation service checks the reputation of a file against an extensive in-the-cloud database before permitting user access. The service uses high-performance content delivery networks and local caching servers in order to assure minimum latency during the checking process. Typically, the cache stored on the local, client-side is based upon queries sent to the file reputation service. But, this cache may be purged if many queries are sent or if there is an incomplete update; this presents a problem in that the cache is then not useful.

At the same time, though, the Internet network traffic being handled by the backend servers of a file reputation service is increasing dramatically in terms of incoming queries. Network traffic is increasing week-by-week and this means many thousands of dollars must be paid by the operator of the file reputation service to an Internet traffic company such as Akamai for the increase in traffic.

Using Akamai as an example (there are other such services) in the context of a file reputation service, the service may upload data to one Akamai server. Then, the Akamai server will distribute this data worldwide to Akamai servers. Finally, clients can access the nearest Akamai server to download what they need. Of course, all of this activity means increased network traffic and cost.

Network traffic usage is increasing not only because of more clients using the service, but also because of a limitation on the local client cache which requires a query to be sent out over the Internet to the backend servers. As mentioned above, this limitation is that the cache might be purged prematurely, and there is no quick and easy way to find out which items in cache should be kept without downloading them again and again.

Because a response from a backend server of the file reputation service may take more than 350 ms, while a response from a local client cache may take only 1 ms, it is important to make better use of a client cache instead of relying upon access to a backend server. To those ends, further techniques for better utilizing a local client cache in the context of a file reputation service or for any other suitable service are desired.

SUMMARY OF THE INVENTION

To achieve the foregoing, and in accordance with the purpose of the present invention, a technique is disclosed that allows a pre-fetch cache to be downloaded all at once to a client computer.

Whereas a client with a traditional cache needs to send out multiple queries in order to accumulate a usable cache one-by-one, the present invention provides a customized pre-fetch cache generated in the cloud that the client may retrieve with on the order of only a few queries. In other words, the entire pre-fetch cache can essentially be retrieved at once using the steps described below.

An access log of a backend server includes any number of data records each describing a previous query regarding a suspect computer file of a client computer. Each record includes the CRC code for the suspect computer file, the result of the malware analysis performed on the backend server and other attributes and values. The log is analyzed to retrieve relevant attributes and values from each record. Key attributes and values are generated from the data in each data record such as region, continuous query, up-to-date pattern and CRC summary count. All CRC codes are grouped according to attribute values that each has in common with one another. There may be many groups formed each including any number of CRC code-result pairs. Each group is analyzed to determine the network traffic associated with downloading the entire group to all user computers and the network traffic associated with not downloading the group but responding to future malware queries regarding CRC codes in the group. CRC codes are removed from each group if necessary and the network traffic is iteratively calculated to maximize the reduction in network traffic. Each group may be then downloaded to all user computers as a pre-fetch cache.

The advantages are numerous. For one, on the order of 20% traffic reduction can be achieved and scanning may be faster by 10%, thus saving many thousands of dollars per month paid to Internet bandwidth providers. Further, two kinds of traffic may be reduced: 1. network traffic between Akamai servers and all clients of an anti-virus service provider such as Trend Micro, Inc. (thus reducing network environment overhead for the client); and, 2. network traffic between Trend Micro servers and Akamai servers (thus reducing the service charge from Akamai).

BRIEF DESCRIPTION OF THE DRAWINGS

The invention, together with further advantages thereof, may best be understood by reference to the following description taken in conjunction with the accompanying drawings in which:

FIG. 4 is a table listing attributes in a data record of an access log.

FIG. 5 is a table listing defined attributes based upon attributes and values in a data record.

DETAILED DESCRIPTION OF THE INVENTION

In addition to Web and e-mail reputation technologies, traditional malware scanning tools identify infected files by comparing several hash values of the file content with a list of hash values stored in a pattern or signature file. If a file is marked "suspect" in the first pass of a hash comparison, the scan engine employs a multi-phase approach to further drill down. In many conventional tools, this pattern file is located on the endpoint computer and is distributed regularly to provide protection against the latest threats.

File reputation technology decouples the pattern file from the local scan engine and conducts pattern file lookups over a network to a file reputation service server. The server may reside on the customer premises (a private cloud) or even on the Internet (a public cloud). This in-the-cloud approach alleviates the challenge of deploying a large number of pattern files to hundreds or even thousands of endpoints. With this approach, as soon as the pattern is updated on the cloud server, protection is immediately available to all clients accessing that scan server. The file reputation databases in the cloud receive constant updates—enabling a provider to quickly respond to and remediate new file-based threats. Similar technologies are also available for Web and e-mail scanning.

Figure 1:
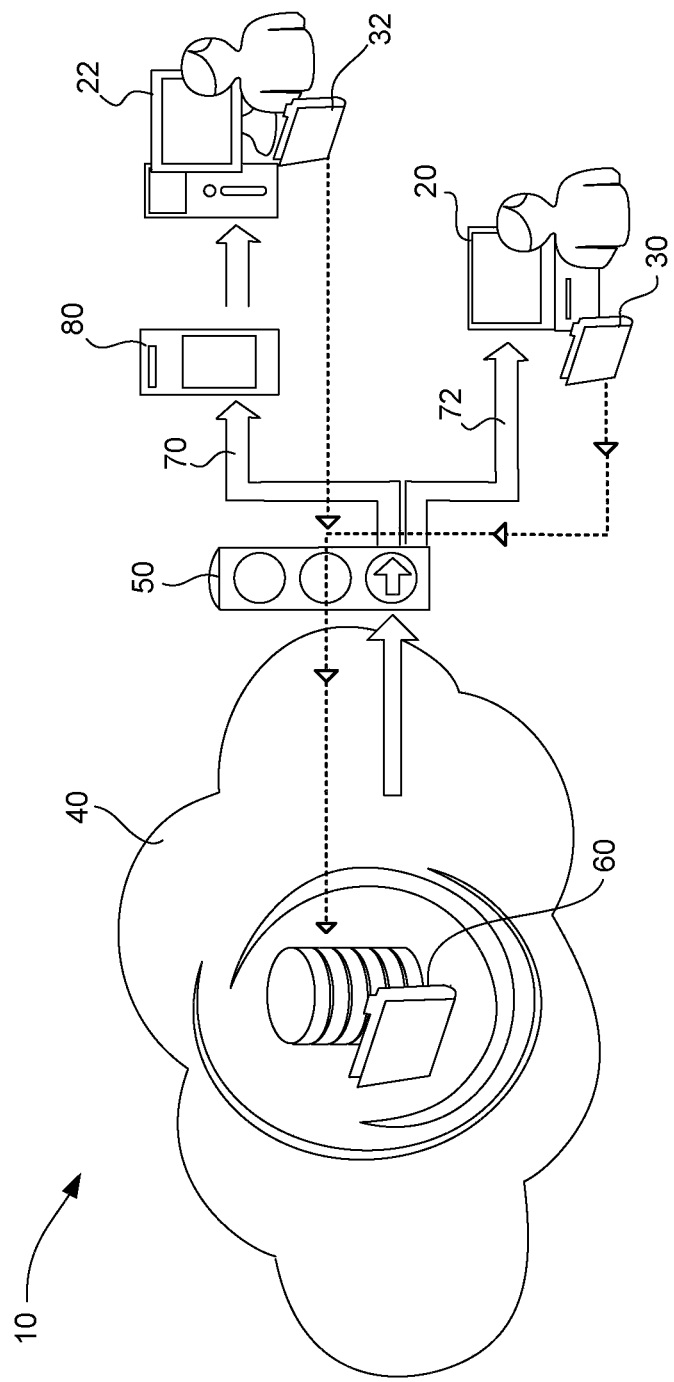
FIG. 1 illustrates a prior art file reputation service.

FIG. 1 illustrates a prior art file reputation service 10. Shown are any number of user computers 20, 22 and their respective files 30, 32 that need checking for malicious content. An individual file may be sent over the Internet 40 to a file reputation service 60 where a database is used to check the contents of a file to determine whether or not it is malicious. Preferably, a CRC code is calculated for each file and it is the CRC code 30 which is sent over the Internet for checking. As known in the art, a cyclic redundancy check (CRC) is a hash function that produces a short, fixed-length binary sequence (known as the CRC code) when applied to a stream of digital data, such as a computer file. It can produce a somewhat unique identifier for a given computer file. Of course, other techniques and other hash functions may also be used to calculate a unique identifier for a computer file in the context of the present invention. Typically, CRC codes are sent for those files which are suspected of being malware. A software product 50 (such as an anti-virus product from Trend Micro installed on the client site) is used to handle transmissions between the computers and the service.

A response from the service may then be sent 70, 72 back to each of the user computers. Each user computer or a specialized caching server 80 may store these queries and the results of these queries in a cache so that future queries for the same file do not have to travel over the Internet to the file reputation service. As mentioned above, this type of cache implementation is a limitation on the service. Because the client cache works on the basis of historical data, a query needs to be sent out first so that the returned item can be stored in the cache and accumulated one-by-one. Needless to say, this process of building up the cache one-by-one is slow and results in many queries not hitting the cache, but rather being sent over the Internet to the file reputation service which has a slower response time.

It is realized that it may be possible to avoid accumulating items in the cache one-by-one. A so-called "pre-fetch cache" of multiple items may be generated in a cloud server all at once, and then downloaded to a client computer to obviate the need for the client computer to send out frequent requests over the Internet.

Block Diagram

Figure 2:
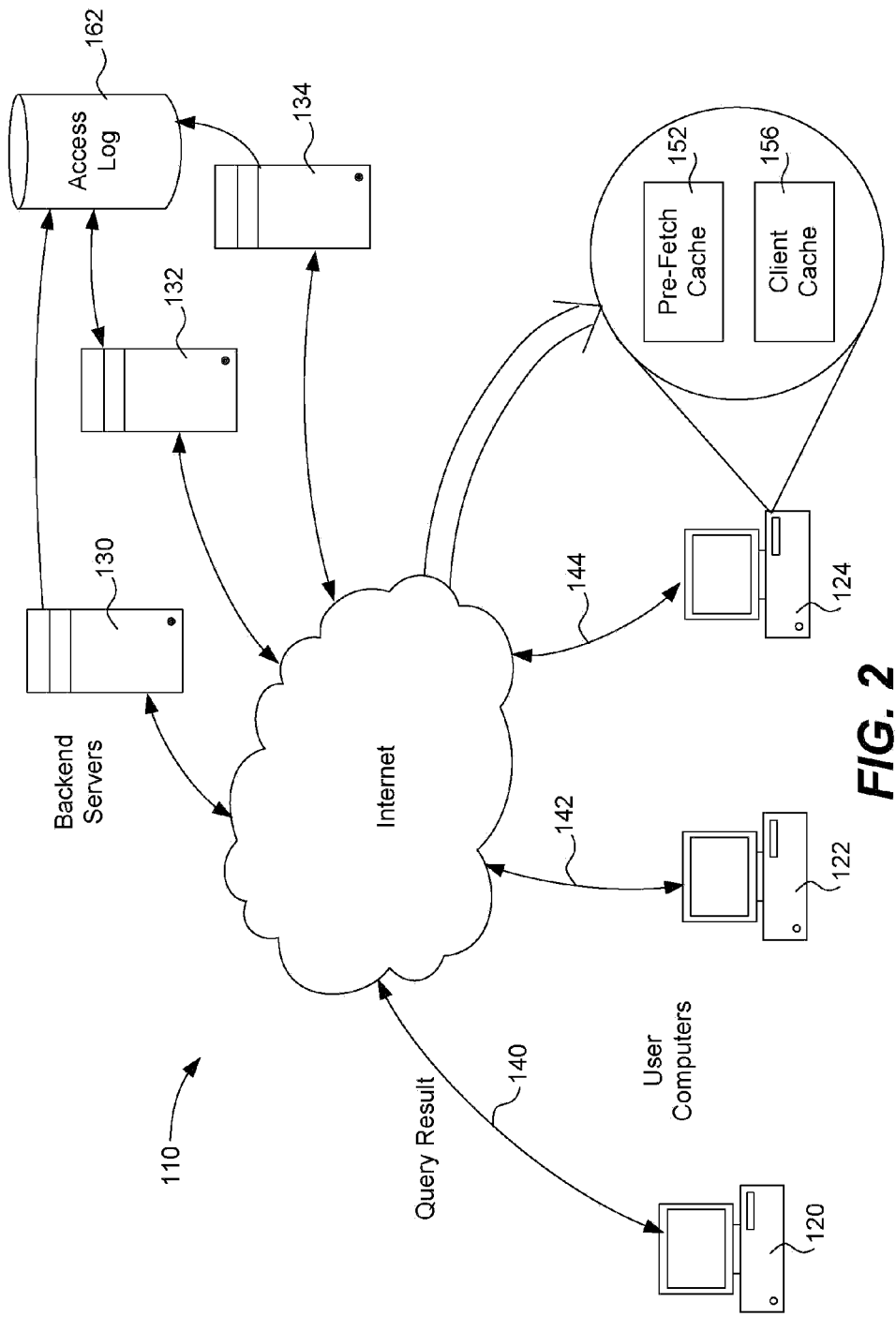
FIG. 2 is a block system diagram of the present invention.

FIG. 2 is a block diagram illustrating one embodiment of the invention. Shown are any number of user computers 120-124 that communicate over the Internet or other network to any number of backend servers 130-134 which are typically operated by an entity such as an antivirus service provider (e.g., Trend Micro Inc.). These user computers may represent an individual computer in a household that is running an antivirus software product, an office computer within a corporation running an antivirus business software product, a server computer within an entity (being responsible for the security of any number of end-user computers) running an enterprise version of a security software product, or other computer arranged to submit queries and receive results as described herein. These user computers are preferably distributed worldwide within any number of independent entities such that the queries received from them best represents a worldwide or region-wide view of malware activity.

The antivirus service provider may use a single backend server to field queries and provide results, or may use any number of backend servers to process the queries. For example, a particular backend server may be dedicated to a certain product or products of an entity, may be used to respond to queries from particular countries or regions for load balancing purposes, or the provider may pay a Web service provider (e.g., Akamai) to provide this kind of service.

As described above, a user computer determines that a file is suspect, calculates its CRC and sends this CRC code as a query 140, 142, 144 to one of the backend servers. There may be more than one CRC code calculated for an individual file that must be checked. Typically, a user computer checks a CRC code against a security software product, various lists or a local cache (e.g., client cache 156) before making the determination that the CRC is suspect and must be sent over the Internet. Not every calculated CRC must be sent over the Internet to the backend servers, but if it is, this increases the network traffic and the associated burden on the backend servers and cost to the antivirus service provider. One of the backend servers will receive this query, determine whether the CRC code represents a malicious file (using any combination of well-known or proprietary techniques) and send a result 140, 142, 144 back to the requesting user computer. This result typically includes the original CRC and a result value indicating whether or not the computer file from which the CRC was calculated is malicious or not.

The present invention realizes that it is possible to deliver a pre-fetch cache 152 to each of the user computers against which each user computer may compare a suspect CRC code. Advantageously, this pre-fetch cache 152 need not be built up query-by-query as in the prior art and may be delivered to each user computer periodically with a minimum of effort expended by the user computer and with a minimum impact on network bandwidth. Accordingly, a user computer is supplied with a relatively large pre-fetch cache 152 (compared to the prior art client cache 156) that is available for use and will dramatically cut down on the number of queries needing to be sent to the backend servers. Any user computer may use the pre-fetch cache 152 on its own or in conjunction with the client cache 156. As with the client cache, the pre-fetch cache typically will include a number of CRC code-result pairs.

An access log 162 is a database including any number of records where each record reflects a query sent from a user computer around the world. There may be a single access log representing any number of backend servers or each backend server may keep its own access log (not shown). In the case where each backend server has its own access log, a single access log 162 may be developed by combining all of the individual access logs. In the example shown, backend servers 130-134 deliver records from queries unidirectionally to the access log 162, and in addition, backend server 132 is able to retrieve records from the access log in order to implement the present invention using suitable software. The pre-fetch cache 152 developed upon server 132 will eventually be deployed to each of the user computers desiring to implement the present invention.

Flow Diagram

Figure 3:
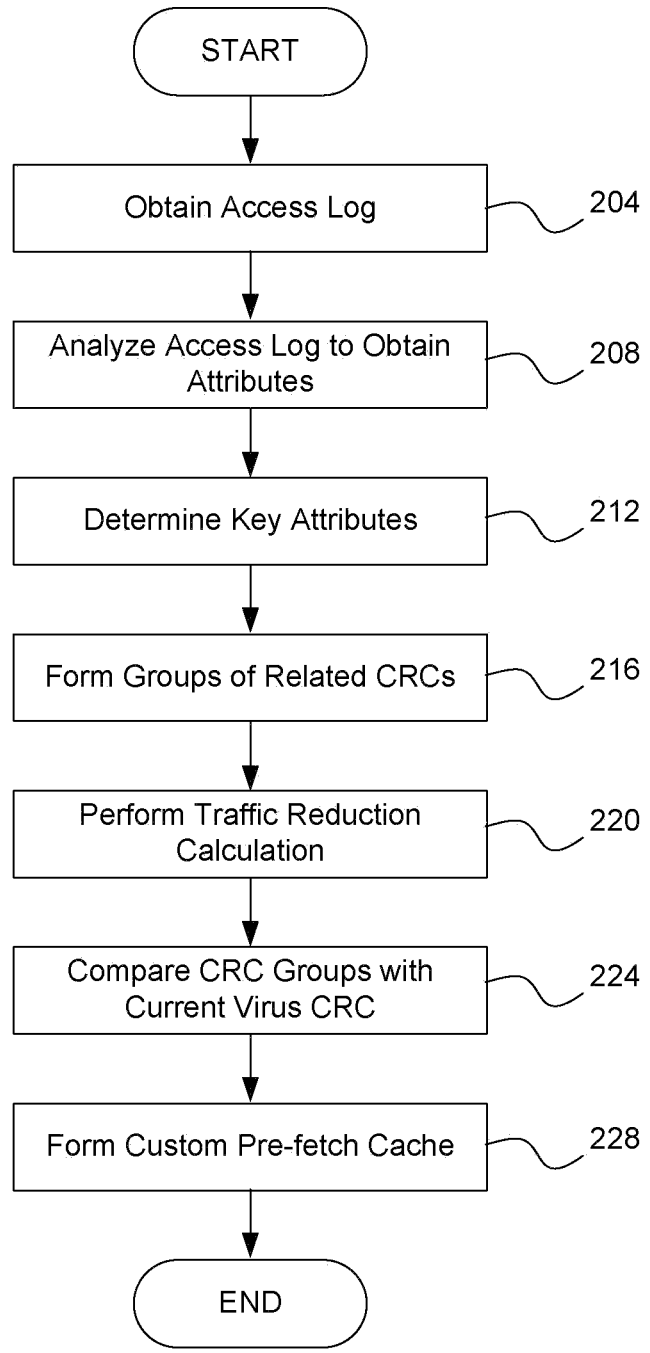
FIG. 3 is a flow diagram describing one embodiment of the invention.

FIG. 3 is a high-level flow diagram describing one embodiment for implementing the present invention. It is contemplated that a suitable software module upon one of the backend servers will implement the steps shown in FIG. 3, although it is possible for the steps to be distributed among many computers and coordinated by a single computer. In step 204 an access log 162 is obtained, located or accessed by a software module executing upon backend server 132. As mentioned above, this access log includes real-world data from around the world and from many different entities, documenting the CRC queries that have been sent to the backend servers for analysis. Each query results in a record being created and stored in the access log. For example, there may be over ten million records in the access log. Typically, a query on a user computer originates with a security software product that desires to know whether a particular file is malicious or not; the access log is typically also under control of the entity that sells the security software product. Examples of security software products that may send queries include: OfficeScan, PC-cillin, Worry-Free, etc., available from Trend Micro; or other products from other anti-virus service providers.

Analyze Access Log

In step 208 the access log 162 is analyzed to obtain a variety of attributes and their values for each record, as well as defining additional attributes and values not necessarily present within the access log. In one embodiment, the method processes each record of the access log in turn in order to pull out particular fields and data; other information may be present within each record.

FIG. 4 is a table 300 illustrating some of the various attributes and values that are retrieved from each record. An attribute column lists the various attributes of each record and the value column lists the corresponding value. For example, the IP address 304 is the IP address of the user computer that sent the query. A timestamp 308 indicates the time when the query was received at the backend server. The field destination server 312 indicates which particular backend server (in the case of many) actually received the query. Many backend servers may be used for a variety of reasons. For example, a particular security software product may send its query to a particular backend server while other products may send their queries to different servers. Or, different countries or regions may be directed to send their queries to particular backend servers to assist with load balancing.

Field 316 is a Bloom Filter version number indicating which particular Bloom Filter pattern is used on the client side to filter out CRC codes. This pattern is used to reduce the number of CRC codes that are sent to the backend server. Depending upon a comparison of a CRC code with the Bloom Filter pattern, the CRC may be sent to the backend server or not sent. Other types of filters may be used, or none at all. The actual CRC code and its type are included within field 320; this example shows that the CRC type "LCRC" was used. The status code 324 is a response code used in the HTTP protocol to indicate a successful communication to the client. Size 328 indicates the size of the query in bytes. Product 332 indicates the particular security software product initiating the query, its version number, and build number.

Client identifier 340 is a unique identifier identifying the particular user computer that sent the query. Other information may be included in each record that is not necessarily extracted in step 208. This information includes the destination server IP address. After the client sends the query the server will respond. The file reputation service then uses the return code (result) from the response to judge the file. This result can be obtained from a "content length" of the access log or listed explicitly in the access log; this result tells whether the file is dangerous or safe.

FIG. 5 is a table 350 illustrating the defined attributes and values that are generating using information from each record. As mentioned above, while certain data values may be retrieved directly from each record of the access log, it is desirable to generate other data values corresponding to each query using the information in each record. In this example, all of the defined attributes relate to a particular client, i.e., a particular security product running on a user computer in a specific location. In other words, while table 300 relates to each query sent, table 350 is generated from the access log for a specific period of time; the period of time depends upon how large a cache we wish to predict. For example, table 350 illustrates a defined attribute column holding the desirable attributes, a value column holding the generated data, and an explanation column.

The defined attribute "continuous query" 354 is an attribute that identifies client software on a user computer which sends the same CRC query within the next second. The value "count number" indicates how many times this happens within a particular time frame, such as within the past seven days.

The defined attribute "region" 358 identifies the country in which the client software and user computer are located and may be determined by converting the IP address of the user computer to a particular region. The defined attribute "up-to-date pattern" 362 indicates whether or not the client is using a Bloom Filter pattern that has not been updated within the last 24 hours (for example). The defined attribute "CRC summary count" 366 indicates how many search queries this client has sent within a particular time frame, such as within the past seven days.

Another defined attribute ("Region Count," not shown) may be generated which is how many times a particular CRC code has been sent to the backend servers from a particular region within a particular time frame. This attribute does not describe a particular client, but rather helps to characterize the behavior of a particular region with respect to a single CRC code. This defined attribute will be used in step 220 as discussed below.

After the access log has been analyzed in this step 208 and the various attributes of tables 300 and 350 have been identified or generated, there may be as many eight million individual CRC entries identified, more than 10 retrieved data attributes and as many as 5 or more custom, defined attributes (in the context of 10 million access log records). Each CRC entry includes the CRC code itself as well as the result of that query (malware or not), and it is these CRC entries that will be grouped together in later steps.

Determine Key Attributes

In step 212, certain key attributes of the retrieved and defined attributes of step 208 are identified for further use in the invention. These key attributes will then be used in the next step as characteristics to form groups of related CRCs. In other words, CRCs having the same values for these key attributes would be placed into a single group. Statistical tools may be used to determine the preferred key attributes. Since CRCs in the same group have similar behaviors (as evidenced by the key attributes having the same values), an assumption can be made that the client computers responsible for sending these CRC queries may have similar behaviors and one may predict future user queries from these client computers. As explained below, a unique pre-fetch cache may be generated for client computers in the same group. In this fashion, we maximize the hit rates of queries on the pre-fetch cache to reduce queries over the Internet to the backend servers and reduce costs.

In one embodiment, we find the key attributes by applying a two-step clustering methodology to the inputs, namely the eight million CRC entries, the retrieved data attributes and the custom, defined attributes. This two-step clustering methodology may be performed using SPSS, a known statistical tool available from an IBM company. Preferably the old version is used; after the company was acquired by IBM the software name became "PASW" and then became "IBM SPSS Statistics" in a different version.

In the first step, the tool calculates the best numbering for forming different groups. It is preferable that a group always include more than one entry; if the number of entries in a group ever reaches one then the number of groups are reduced and the calculation is performed again. This step uses one of the SPSS functions; it helps to calculate the best number for forming different groups after feeding in the information. The second step checks the results from each attribute's calculated chi-square distribution. If each attribute and its value can be clearly identified as being unique enough to form a group, then that is a determined key attribute.

Figure 6:
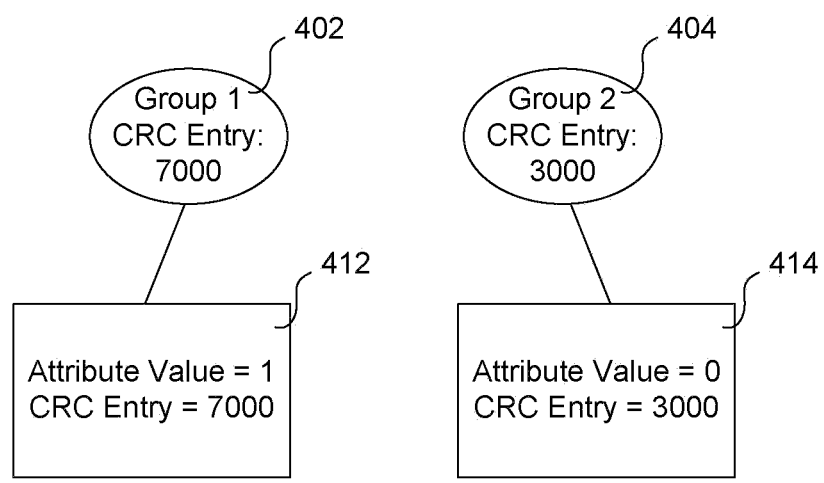
FIG. 6 illustrates the forming of groups.

FIG. 6 illustrates an example of determining a key attribute. Shown is a group 402 having 7,000 CRC entries and a group 404 having 3,000 CRC entries. A single attribute has been selected as a key attribute and in group 402 this attribute has a value 412 of 1, while in group 404 this attribute has a value 414 of 0. In other words, all of the CRC entries in group 402 share a key attribute having a particular value, while all the entries in group 404 share that same attribute but with a different value. Therefore, this attribute may be considered a key attribute.

After comparing the clustered chi-square distribution results returned from the retrieved and generated attributes, there will be a set of key attribute candidates. By repeating the clustering process with one traffic-related attribute (such as "continuous query") and one other retrieved attribute, there will be determined a set of key attributes. This "other retrieved attribute" may be one of the attributes from FIG. 4 or it may be one of the attributes from FIG. 5. Both possibilities will work, it depends upon which candidates are being chosen as the key attributes. The clustering process is a known general statistical methodology: its function is implemented in SPSS.

The goal of determining key attributes in this embodiment in general is to minimize the number of key attributes. Choosing too many key attributes will take more time to analyze; furthermore, some attributes are chaotic or reflect random queries, so there is no need to process them.

In one preferred embodiment, there are three key attributes determined and these are the attributes region 358, product 332, and continuous query 354. The attribute "continuous query" is notable in that it is a traffic-related attribute because it directly relates to a measure of network traffic. In this embodiment, these three attributes are well-suited for identifying CRC entries that will be useful to have in a pre-fetch cache for user computers in a particular region. In other words, a group of CRC entries that are all from the same region and product, and have an indication that these CRC queries are repeated for that product, will be a very beneficial group to have in a pre-fetch cache for any client in that region because queries over the Internet can be reduced. For example, using these three key attributes, a group X of CRC entries may be formed having values of these attributes of "Asia," "Office Scan Corporate Edition," and a count value greater than a predetermined number. The defined attribute "continuous query" is derived from the access log; the access log is analyzed in a certain period of time to obtain its value.

Therefore, because the CRC entries of this group X are mainly sent from the client software Office Scan from computers in Asia, and because these queries are repeated, it may be very beneficial to deploy this group X of CRC entries as a pre-fetch cache to computer users in Asia. Of course, other key attributes may also be determined. In this fashion, these three key attributes have identified a characteristic behavior of certain client products in this region, and this knowledge will then be used to create a custom pre-fetch cache for products in that region.

Form Groups of Related CRC Entries

Once the key attributes have been determined in step 216 any number of groups are formed of related CRC entries. Preferably, groups contain CRC-result pairs, i.e., each item in a group is a CRC code paired with its result (malware or not malware). It is possible that some groups may not have any items.

For example, if the key attributes are region, product and continuous query, then a group Y will include all CRC entries whose attribute values for region, product and continuous query are the same. In other words, a CRC record having values for these attributes of North America, "House Call" and "1" will be placed into the group Y along with any other CRC record having these same values. All of the eight million CRC entries will be processed in this manner and formed into groups. In this embodiment, 99 groups of CRC entries are formed, where each CRC entry includes the CRC code and the result from the query.

Figure 7:
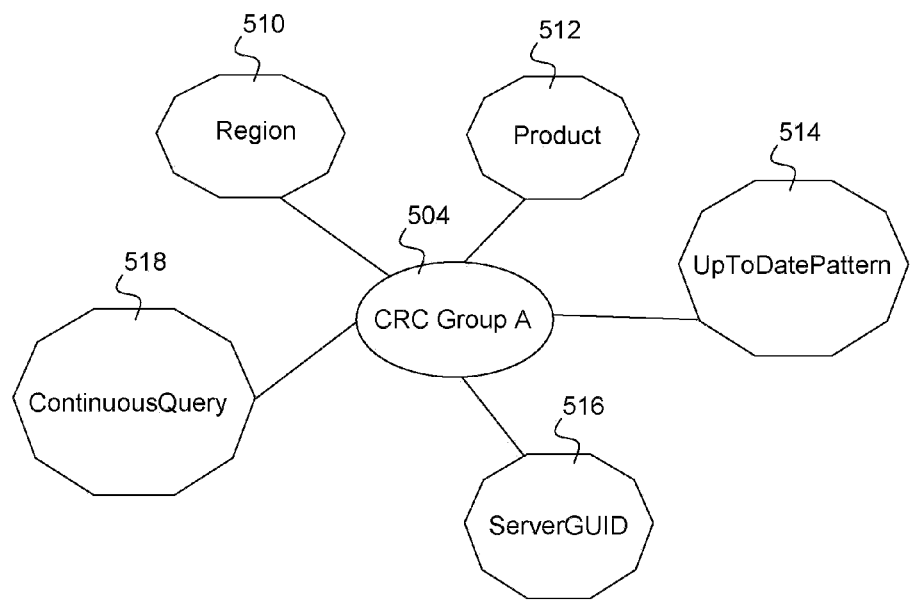
FIG. 7 illustrates a particular group and its attributes in common.

In another example, five key attributes are determined and these are: region, product, up-to-date pattern, and continuous query. Assuming that a group A is formed where the respective values for these attributes are Taiwan, Office Scan, Yes, "xxx-aaa-ccc-ddd," and "1," then this group A would include all CRC entries where the record corresponding to that CRC has attributes with these same values. FIG. 7 illustrates a formed group A graphically. Shown is a group of CRC entries 504 and the various key attributes region 510, product 512, up-to-date pattern 514, and continuous query 518.

Now that the groups of related CRC entries have been formed it is possible to deploy these groups as pre-fetch caches to the various user computers. For example, the group Y formed above may be deployed to all client computers in the North America region because this group has the attribute North America region in common (among others), and it is likely that other client computers in this region would be attempting to send the same CRC query as other computers in this region. In another example, all of the CRCs of the group A formed above may be sent to all client computers in Taiwan. In a further refinement, it may be desirable to only send this group to computers in Taiwan using the particular product that they have in common.

Because the size of each of these groups of CRC entries may be quite large, though, it is beneficial to perform a traffic reduction calculation first in order to determine whether deploying these groups actually will reduce network traffic.

Perform Traffic Reduction Calculation

In the described embodiment, because there are over eight million CRC entries formed into 99 groups, it is possible that some of the groups may be on the order of thousands or hundreds of thousands of entries in size. Downloading one or some of these groups as a pre-fetch cache to a single client on a user computer may actually take up more network traffic bandwidth than if the present invention were not implemented and the user computer built up its cache one-by-one as queries were submitted. Therefore, it is beneficial to perform a calculation of traffic volumes and even to determine if certain CRC entries should be deleted from a group before that group is downloaded to a client as a pre-fetch cache. This calculation is performed on each group.

The traffic reduction calculation may be performed on the basis of downloading a group to a single user computer or on the basis of downloading a group to all of the user computers. For example, assuming we have three groups where the calculation is positive, then we attempt to enforce that all user computers in these three groups download their dedicated pre-fetch cache. Preferably, we generate a different pre-fetch cache for each different group based on the calculation.

Figure 8A:
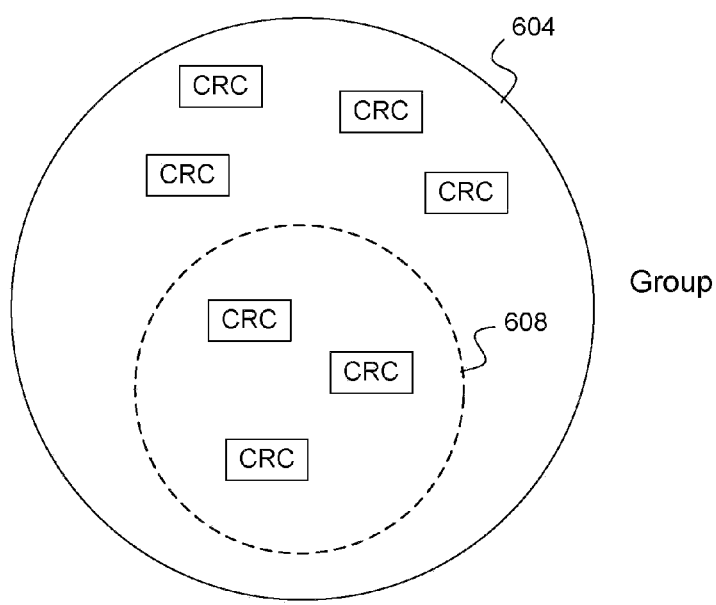
FIG. 8A illustrates a group of CRC codes.

FIG. 8A illustrates an example in which a group 604 includes any number of CRC entries shown inside the solid circle. If the group were downloaded all at once to a user computer as a pre-fetch cache in accordance with the present invention than all of the CRC entries within circle 604 would be downloaded and would contribute to a certain level of network traffic volume. But, if the present invention is not implemented, then all of these entries would not have to be downloaded at once but there is a certain subset 608 (shown in the dashed line) of CRC entries that would be queried by the user computer and results would have to be returned, also contributing to a certain level of network traffic volume. If the volume of network traffic created by downloading the pre-fetch cache 604 is greater than the volume of network traffic created in a forecast future time by responding to queries for subset 608, then it would not seem worthwhile to download group 604 as a pre-fetch cache.

Figure 8B:
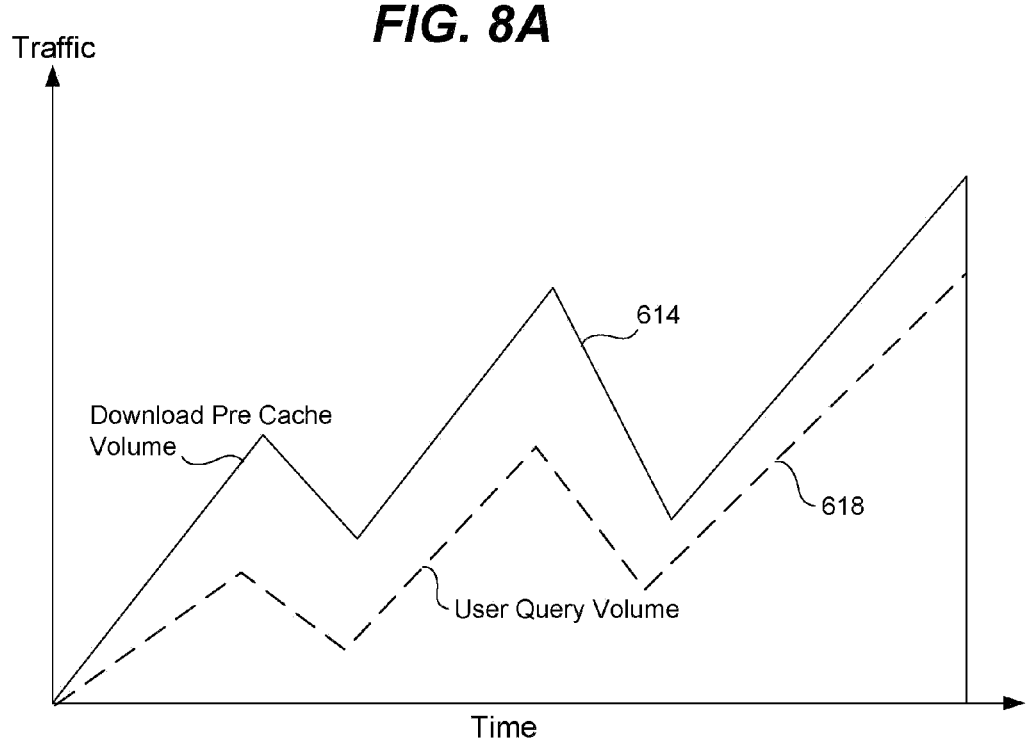
FIG. 8B is a graph illustrating the predicted network traffic of downloading the pre-fetch cache versus traditional user query volume.

FIG. 8B graphically illustrates a comparison of network traffic volumes created by either scenario. The x-axis represents a given future time period, such as the next seven days, while the y-axis represents the amount of traffic volume at a particular point in time. Therefore, if the amount of user queries can be forecast for the next seven days (i.e., normal queries resulting without implementing the present invention), then the area under dashed line 618 represents the user query volume in terms of network traffic bandwidth that is used up. In other words, a prior art approach in which only CRCs in subset 608 are queried over a future time period results in a user query volume. On the other hand, if the present invention is implemented then all CRCs in group 604 are downloaded all at once and the volume of the network traffic bandwidth used up may be estimated using the area under solid line 614. In this example, since the volume of network traffic created using the pre-fetch cache approach (area under line 614) is greater than the user query volume traffic created without deploying the pre-fetch cache (area under dashed line 618), then it is advisable not to deploy this group as a pre-fetch cache.

In this situation, it is possible to remove a certain number of CRC entries from group 604 and to perform the calculations again. If the CRC entries are removed intelligently (i.e., using criteria designed to reduce the volume associated with downloading the pre-fetch cache), then at some point the calculations may reveal that the volume associated with the pre-fetch cache is less than the volume associated with traditional user queries. This process of performing the calculations, removing CRC entries from the group, and performing the calculations again, is performed repeatedly on each group until a maximum possible savings in network traffic bandwidth is determined. Of course, it is possible that the difference between the two volumes for a particular group would always be negative (such as is shown in FIG. 8B) in which case that particular group would not be downloaded as a pre-fetch cache.

Figure 9A:
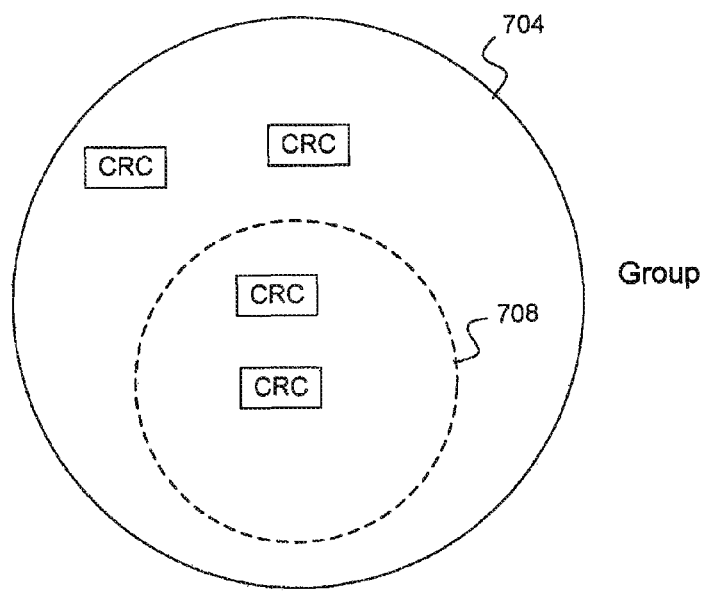
FIG. 9A illustrates a group of CRC codes.

FIG. 9A illustrates an example in which group 704 includes a reduced number of CRC entries shown inside the solid circle. A number of CRC entries have been removed from this group in order to determine if implementing the present invention is advantageous in this new situation. Removal of CRC entries from group 704 may result in removal of entries from subset 708 but not necessarily. In this new situation, if the volume of network traffic created by downloading the pre-fetch cache 704 is less than the volume of network traffic created in a forecast future time by responding to queries for subset 708, then it would seem worthwhile to download group 704 as a pre-fetch cache.

Figure 9B:
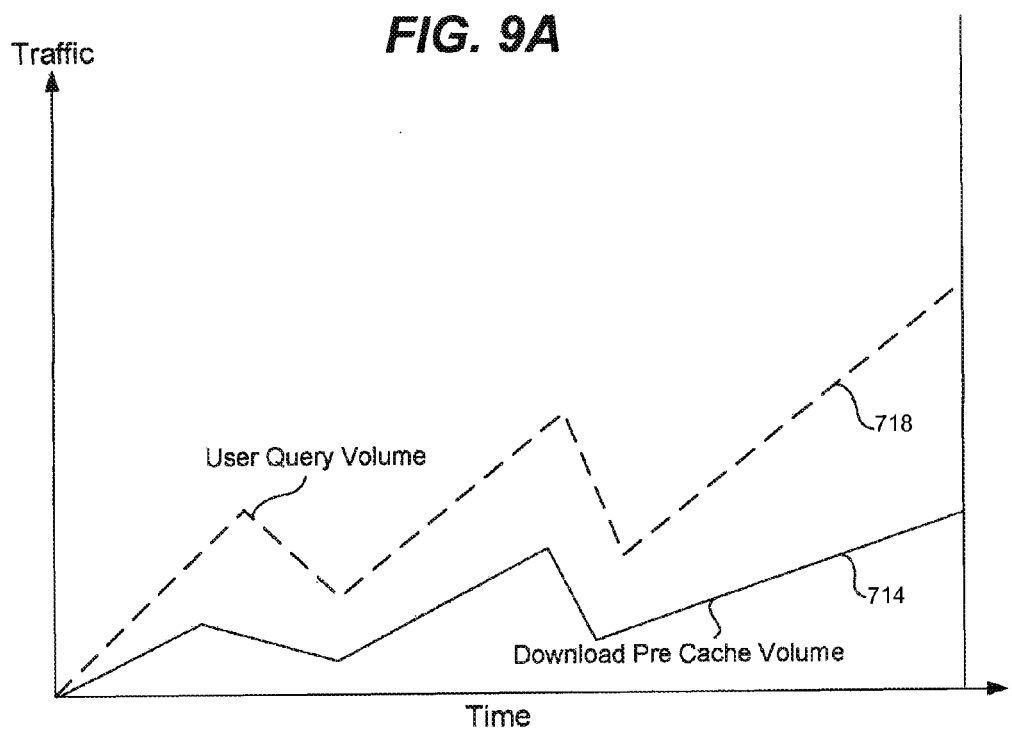
FIG. 9B is a graph illustrating the predicted network traffic of downloading the pre-fetch cache versus traditional user query volume.

FIG. 9B graphically illustrates a comparison of network traffic volumes created by this new scenario. The x-axis represents a given future time period, such as the next seven days, while the y-axis represents the amount of traffic volume at a particular point in time. Therefore, if the amount of user queries can be forecast for the next seven days (i.e. normal queries resulting without implementing the present invention), then the area under dashed line 718 represents the user query volume in terms of network traffic bandwidth that is used up. In other words, a prior art approach in which only CRCs in subset 708 are queried over a future time period results in a user query volume. On the other hand, if the present invention is implemented then all CRCs in group 704 are downloaded all at once and the volume of the network traffic bandwidth used up may be estimated using the area under solid line 714. In this example, since the volume of network traffic created using the pre-fetch cache approach (area under line 714) is less than the user query volume traffic created without deploying the pre-fetch cache (area under dashed line 718), then it is advisable to deploy this group as a pre-fetch cache. Another way to reach this conclusion is to subtract volume 714 from volume 718 and if the result is positive, then the pre-fetch cache should be deployed.

Although FIGS. 9A and 9B are presented as an iteration of the original group shown in FIGS. 8A and 8B, it is entirely possible that the initial calculation of a group may result in the scenarios shown in FIGS. 9A and 9B. Even in this situation, it is advantageous to iterate over the group, strategically removing CRC entries in order to achieve the maximum traffic bandwidth savings.

One particular embodiment of the present invention utilizes the below algorithm to calculate the estimated traffic reduction for each group (essentially subtracting the traffic volume associated with the pre-fetch cache from the traffic volume associated with traditional user queries). A positive value for the traffic reduction means the group should be deployed as a pre-fetch cache. After grouping all the CRCs from the previous step, this traffic reduction forecast algorithm will help to determine if a group is worthwhile for deployment as well what is the best deployment size for that group (i.e., should entries be removed before deployment).

Consider that variable n=the total number of original CRC entries in a group, and that variable m=the number of CRC entries in a group once some entries have been removed. The algorithm then operates to count iterations of m from 0 to n, for the purpose of obtaining the maximum value of m and its CRC when calculating traffic reduction. As will be explained below, is often advantageous to remove CRC entries from groups that are not queried that often by the client. Each calculation is for a certain period of time and will predict a pre-fetch cache. It can be advantageous to remove those CRCs which are not queried that often by comparing the new pre-fetch cache and old pre-fetch cache. It is preferable to calculate a pre-fetch cache for each group as a unit, not for single user. The following formula may be used to calculate the traffic reduction for particular values of m:

$$\left[\sum_{i=1}^{m} \int_{t1}^{t2} f_i(t) dt\right] \times CRC_{avgquerysize} - \left[\int_{t1}^{t2} g(t) dt\right] \times$$

$$(CRC_{avgquerysize} + Deploy_{size}) = \text{Traffic Reduction}$$

Figure 10:
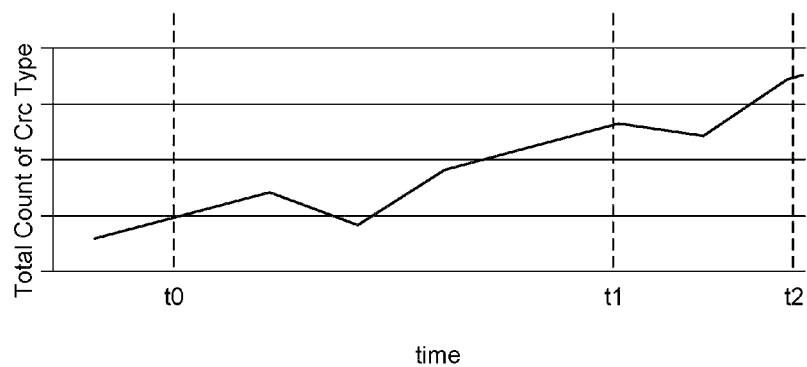
FIG. 10 is a graph illustrating the time periods for calculating network traffic reduction.

FIG. 10 graphically illustrates a timeline showing total CRC counts and the relative positions of the time parameters used in the above formula. In this graph time is on the x-axis and total CRC count is on the y-axis. We define: t0 as being the starting point of the data analysis; t1 as being the starting point of deploying the pre-fetch cache; t2 as being the cache TTL (time-to-live) period of seven days; and the time period of t0-t1 being the analysis of the current data.

Further variables in the formula are defined as follows:

Deploy_size=$m \times CRC_{avg\ cache\ size}$ $$\sum_{i=1}^{m} \int_{t1}^{t2} f_i(t) dt =$$

Total CRC count between $t1$ and $t2$ for indidual CRC type where $f_i(t)$ is a prediction function for a given CRC type i.

A special condition may apply when this prediction function results in a negative value, i.e., when $f_i(t)<0$. What this means is that at any given point of time, if the area under a curve is a negative value, this might due to probability of error. This can be treated as a special case from a data analysis standpoint.

$\int_{t1}^{t2} g(t)dt$=Total Clients need to deploy between $t1$ and $t2$ where g(t) is the prediction of the total number of clients (user computers) who will receive the pre-fetch cache.

One way to explain the formula is to understand that the quantity of the first part on left hand side represents the forecast traffic (assuming that the pre-fetch cache technique is not implemented), and the quantity of the second part on the left hand side represents the deployment traffic (when the pre-fetch cache is deployed to clients). To determine that it is worthwhile to deploy a group of the pre-fetch cache to a client, the Traffic Reduction result value from the CRC forecast minus CRC for deployment must not be a negative value. If there is a positive value then a traffic reduction flag is associated with this group of CRCs. The range from t1 to t2 is seven days in this embodiment. A range of seven days has been implemented because this graph of FIG. 10 shows a stable periodical wave roughly every seven days, therefore, this range has a better forecasting value.

As mentioned above, if the traffic volume associated with downloading a particular group is greater than the traffic volume associated with performing normal queries, then it is desirable to remove a CRC entry or entries from the group and perform calculations again in order to obtain the maximum achievable traffic reduction. In other words, entries may be removed from a group until the calculation of subtracting the download pre-cache volume from the user query volume yields the greatest value. In one embodiment, this iteration is performed by first removing those CRC entries from a group which have been sent the fewest times from a particular product. If the traffic volume associated with downloading a particular group is always greater than the traffic volume associated with performing normal queries (even after removing any number of CRC entries) then the group is not flagged with a traffic reduction flag and the group will not be downloaded as a pre-fetch cache.

Compare Pre-Fetch Cache with Current Virus Pattern

In many instances, a particular virus pattern (containing any number of CRCs identifying known viruses) for a particular product may be updated as frequently as once per hour. It is possible that any of the CRCs in one of the groups now matches with a known CRC in the updated virus pattern. Because the virus pattern is typically applied on a client computer before the pre-fetch cache is checked, a known virus will be caught by the virus pattern before the pre-fetch cache is checked. Therefore, in this situation, there is no need for that particular CRC that matches to also be present within one of the groups. These CRCs that match with any CRC of an updated virus pattern may then be deleted in step 224 from the groups in order to save on the bandwidth required to send these groups over the Internet to the user computers. This step is useful but optional.

Form Custom Pre-Fetch Cache

Next, in step 228, after any matching CRCs have been deleted from the groups in step 224 a custom pre-fetch cache containing any number of the groups is sent to the user computers in the field. In one embodiment, all groups having the key attribute of "region" which is the same will be downloaded to all user computers in that particular region. For example, if fourteen of the groups have a key attribute of "region" which is North America, then all those groups will be sent to all user computers in the region of North America. Or, one may download based upon product and not upon region. In order to send the pre-fetch cache to user computers in field, it is sufficient to send just the CRCs and the corresponding result. If the result is "virus," the corresponding CRC will be added into the virus pattern and there is no need to handle it any more.

Once each client computer has received its pre-fetch cache and is now processing suspect files and sending out new queries to the backend servers over the Internet, it is possible to begin the process again of obtaining an updated access log from that point in time and reiterating the steps of FIG. 3.

Computer System Embodiment

Figure 11A:
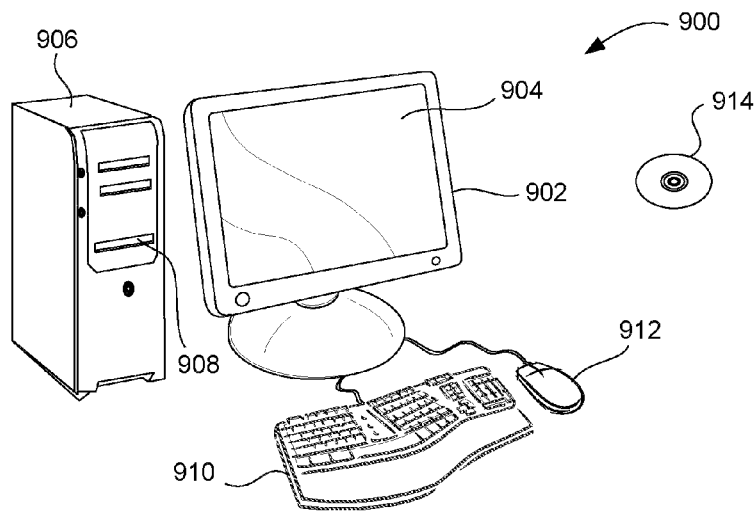
FIGS. 11A and 11B illustrate a computer system suitable for implementing embodiments of the present invention.
Figure 11B:
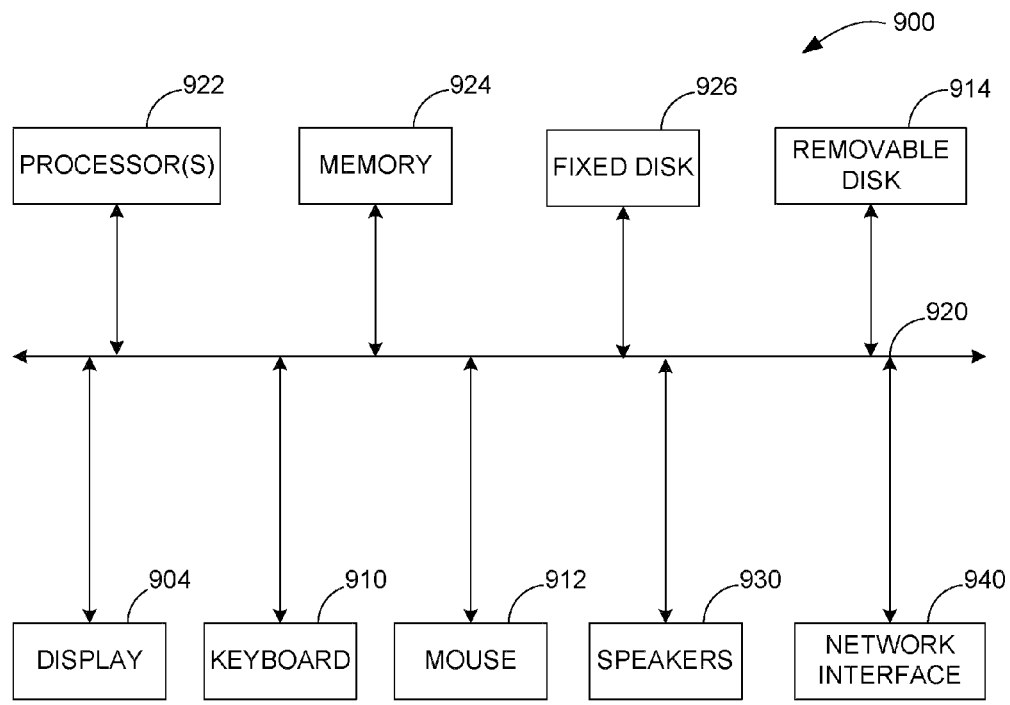

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of forming a cache for use in malware detection, said method comprising:
   retrieving a plurality of hash value-result pairs from an access log database, each hash value uniquely identifying a computer file suspected of being malware and wherein the result of each of said pairs depends upon its corresponding hash value and wherein the result of each of said pairs indicates whether or not its corresponding hash value does identify malware;
   for each of said hash value-result pairs, retrieving at least one other attribute and its value from a data record associated with said each hash value-result pair;
   grouping a subset of said hash value-result pairs into a single group wherein the value of said at least one other attribute is the same for all of said hash value-result pairs in said single group;
   identifying a plurality of user computers each having a characteristic that matches with said same value of all of said hash value-result pairs in said single group; and
   downloading said single group of hash value-result pairs to each of said user computers to be used as said cache.

2. A method as recited in claim 1 wherein each of said hash values is a CRC code.

3. A method as recited in claim 1 further comprising:
   before said downloading, calculating a forecast network traffic volume associated with responding to queries one-by-one from said user computers regarding a subset of said hash value-result pairs; and
   determining that a network traffic volume associated with downloading said single group to each of said user computers is less than said forecast network traffic volume associated with not downloading said single group to each of said user computers.

4. A method as recited in claim 1 wherein said retrieving at least one other attribute further comprises:
   retrieving said at least one other attribute and its value from said data record; and
   generating a defined attribute and a new value based upon said value of said at least one other attribute.

5. A method as recited in claim 1 further comprising:
   determining that a network traffic volume associated with downloading said single group to each of said user computers is greater than a forecast network traffic volume associated with not downloading said single group to each of said user computers; and
   removing at least one of said hash value-result pairs from said single group before said step of downloading.

6. A method as recited in claim 1 further comprising:
   comparing each of said hash values in said single group to hash values in a current virus pattern; and
   removing hash value-result pairs from said single group that match with any of said hash values in said current virus pattern before said step of downloading.

7. A method as recited in claim 1 wherein the value of said at least one of attributes identifies a geographic region and wherein said user computers are located in said geographic region.

8. A method of forming a cache for use in malware detection, said method comprising:
   analyzing an access log database of data records, each data record describing a previously submitted malware query from a user computer;

from each of said data records, retrieving a hash value-result pair identifying said previously submitted malware query;

for each of said data records, generating a key attribute and a key attribute value based upon a value and an attribute of each of said data records, each of said key attribute values being associated with one of said hash value-result pairs;

forming a group of said hash value-result pairs wherein said key attribute value associated with each of said hash value-result pairs in said group is the same;

identifying a plurality of target user computers each having a characteristic that matches with said key attribute value of all of said hash value-result pairs in said group; and downloading said group of hash value-result pairs to each of said target user computers to be used as said cache.

9. A method as recited in claim 8 further comprising:
forming a plurality of groups of said hash value-result pairs wherein said key attribute value associated with each of said hash value-result pairs is the same within any of said groups.

10. A method as recited in claim 8 further comprising:
before said downloading, calculating a forecast network traffic volume associated with responding to queries one-by-one from said user computers regarding a subset of said hash value-result pairs; and
determining that a network traffic volume associated with downloading said group to each of said user computers is less than said forecast network traffic volume associated with not downloading said group to each of said user computers.

11. A method as recited in claim 8 further comprising:
for each of said data records, generating a plurality of key attributes and a key attribute values; and
forming a group of said hash value-result pairs wherein said key attribute values associated with each of said hash value-result pairs in said group is the same.

12. A method as recited in claim 8 further comprising:
determining that a network traffic volume associated with downloading said group to each of said user computers is greater than a forecast network traffic volume associated with not downloading said group to each of said user computers; and
removing at least one of said hash value-result pairs from said group before said step of downloading.

13. A method as recited in claim 8 wherein said key attribute value identifies a geographic region and wherein said target user computers are located in said geographic region.

14. A method of forming a cache for use in malware detection on a plurality of user computers, said method comprising:

retrieving a plurality of hash value-result pairs from a database, wherein each hash value uniquely identifies a computer file suspected of being malware and wherein the result of each of said pairs depends upon its corresponding hash value and wherein the result of each of said pairs indicates whether or not its corresponding hash value does identify malware;

grouping a subset of said hash value-result pairs into a single group based upon the value of an attribute that all of said hash value-result pairs of said subset have in common;

determining a network traffic volume associated with downloading said single group to each of said user computers;

determining a forecast network traffic volume associated with not downloading said single group to each of said user computers and instead responding to queries one-by-one from said user computers regarding said hash values in said single group; and flagging said single group as being a cache suitable for downloading to each of said user computers when said network traffic volume is less than said forecast network traffic volume.

15. A method as recited in claim 14 further comprising:
identifying a subset of said user computers each having a characteristic that matches with the value of a defined attribute associated with all of said hash value-result pairs in said single group; and
downloading said single group of hash value-result pairs to each user computer in said subset of user computers to be used as said cache.

16. A method as recited in claim 15 further comprising:
for each hash value-result pair, retrieving a plurality of attributes and their values from a data record in said database corresponding to each pair; and
generating said defined attribute and its value based upon the value of one of said plurality of attributes.

17. A method as recited in claim 14 further comprising:
determining that said network traffic volume is greater than said forecast network traffic volume; and
removing at least one of said hash value-result pairs from said single group; and
recalculating said network traffic volume and said forecast network traffic volume.

18. A method as recited in claim 17 further comprising:
repeating the steps of claim 17 until said network traffic volume is less than said forecast network traffic volume.

19. A method as recited in claim 17 further comprising:
iteratively removing at least one of said hash value-result pairs from said single group and recalculating said first network traffic bandwidth and said second network traffic bandwidth until the value of said first network traffic bandwidth subtracted from said second network traffic bandwidth is maximized.

20. A method as recited in claim 17 wherein said first and second network traffic bandwidths are determined for the future predetermined time period.

21. A method as recited in claim 1 further comprising:
performing said downloading without receiving requests from said user computers for each of said hash values.

22. A method as recited in claim 8 further comprising:
performing said downloading without receiving requests from said target user computers for each of said hash values.

23. A method as recited in claim 8 wherein each hash value of said hash value-result pairs identifies a computer file suspected of being malware and wherein the result of each of said pairs depends upon its corresponding hash value and wherein the result of each of said pairs indicates whether or not its corresponding hash value does identify malware.

24. A method as recited in claim 14 further comprising:
downloading said single group of said hash value-result pairs to each of said user computers without receiving requests from said user computers for each of said hash values.

* * * * *